US008698826B2

(12) United States Patent
Nishihashi (10) Patent No.: US 8,698,826 B2
(45) Date of Patent: Apr. 15, 2014

(54) DISPLAY DEVICE AND INPUT OPERATION SYSTEM HAVING THE SAME

(75) Inventor: Shigeaki Nishihashi, Nagoya (JP)

(73) Assignee: Denso Corporation, Kariya (JP)

( * ) Notice: Subject to any disclaimer, the term of this patent is extended or adjusted under 35 U.S.C. 154(b) by 727 days.

(21) Appl. No.: 12/886,754

(22) Filed: Sep. 21, 2010

(65) Prior Publication Data

US 2011/0074825 A1   Mar. 31, 2011

(30) Foreign Application Priority Data

Sep. 25, 2009   (JP) ................................. 2009-220842

(51) Int. Cl.
*G09G 5/00* (2006.01)
*G06F 3/048* (2013.01)

(52) U.S. Cl.
USPC .......................................... 345/581; 715/810

(58) Field of Classification Search
None
See application file for complete search history.

(56) References Cited

U.S. PATENT DOCUMENTS 6,414,700 B1 *   7/2002   Kurtenbach et al. .......... 715/810

FOREIGN PATENT DOCUMENTS

| JP | 05-181584 | | 7/1993 |
| JP | 05181584 A | * | 7/1993 |
| JP | 2001-294101 | | 10/2001 |
| JP | 2002-287950 | | 10/2002 |
| JP | 2002287950 A | * | 10/2002 |
| JP | 2006-113920 | | 4/2006 |
| JP | 2008217557 A | * | 9/2008 |
| JP | P2008-217557 A | | 9/2008 |

OTHER PUBLICATIONS

Japanese Office Action dated Nov. 15, 2011, issued in corresponding Japanese Application No. 2009-220842 with English Translation.

* cited by examiner

*Primary Examiner* — Maurice L McDowell, Jr.
*Assistant Examiner* — Donna J Ricks
(74) *Attorney, Agent, or Firm* — Nixon & Vanderhye P.C.

(57) ABSTRACT

A screen has four main regions located in a cross direction and respectively assigned to four operation images. The screen has an outer periphery region around a center region. The outer periphery region includes an unfilled outermost circumference region, a boundary region, which is between operation images adjacent to each other, and a remaining region, in which the four operation images are paved. At least one of the four operation images is located over a corresponding one main region and an adjacent region, which is adjacent to the corresponding one main region in a circumferential direction around the center region. Each of the four operation images has an image region including a largest rectangle region surrounded by sides being in parallel with sides of the screen. The largest rectangle region has an area greater than 50% of a total area of the image region.

3 Claims, 8 Drawing Sheets

DISPLAY DEVICE AND INPUT OPERATION SYSTEM HAVING THE SAME

CROSS REFERENCE TO RELATED APPLICATIONS

This application is based on and incorporates herein by reference Japanese Patent Application No. 2009-220842 filed on Sep. 25, 2009.

FIELD OF THE INVENTION

The present invention relates to a display device configured to indicate multiple operation images on a screen to enable an input operation selectively to the operation images. The present invention further relates to an input operation system having the display device.

BACKGROUND OF THE INVENTION

In recent years, a vehicle such as an automobile is equipped with various in-vehicle devices, such as an audio device, an airconditioner, and a navigation device. Such in-vehicle devices have various complicated functions. For example, JP-A-2001-294101 discloses an input operation system to operate complicated in-vehicle devices. Specifically, the input operation system of JP-A-2001-294101 includes an operation panel on which a select switch group and a function switch group are located. The select switch group is operated for selecting an in-vehicle device to be used. The function switch group is assigned correspondingly to control contents of an in-vehicle device selected by using the select switch group. Thus, in-vehicle devices can be commonly operated by using the function switch group. The input operation system of JP-A-2001-294101 enables a user to operate various kinds of in-vehicle devices. Nevertheless, when a user operates such an input operation system, the user needs to find a switch device from many switch devices on the operation panel. Consequently, such an input operation system may not have a sufficient operability. In particular, when a driver performs a blind operation in a vehicle, it is hard to properly operate such an input operation system.

JP-A-2002-287950 discloses an input operation system including an operation device configured to accept user's operation in one of four directions in a cross form when a user selects a function to be used. In addition, the input operation system of JP-A-2002-287950 further includes a display device to indicate control contents corresponding to the four directions. In this case, indication regions of control contents are assigned to be in the cross form and indicated on the screen in consideration of user's operation in the cross direction. Therefore, a user can be easily understand correspondence between a control content and an operation direction in the cross form. However, in such an input operation system, indication regions of the control contents are small, since being assigned in a cross shape. Consequently, a content indicated in each indication region becomes small to result in spoiling its visibility.

SUMMARY OF THE INVENTION

In view of the foregoing and other problems, it is an object of the present invention to produce a display device configured to enable indication related to an operation in four cross-form directions with enhanced visibility. It is another object of the present invention to produce an input operation system including the display device.

According to one aspect of the present invention, a display device comprises a screen substantially being in a rectangular shape and configured to indicate a plurality of operation images to enable an input operation selectively to the operation images. The plurality of operation images include four operation images. The screen has four main regions located in a cross direction centered on a screen reference position, the four main regions being respectively assigned to the four operation images. At least one of the four operation images forms an enlarged operation image located over a corresponding one of the four main regions and an adjacent region, the adjacent region being continually adjacent to the corresponding one main region in a circumferential direction around the screen reference position. The screen has an outer periphery region being located in an outer circumferential periphery of a screen center region, which includes at least the screen reference position. The outer periphery region includes an unfilled outermost region, a boundary region, which is between operation images adjacent to each other, and a remaining region, in which the four operation images are paved. Each of the four operation images has an image region including a rectangle region surrounded by sides, which are respectively being in parallel with sides of the screen. A largest rectangle region of the rectangle region has a largest area being greater than 50% of a total area of the image region.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
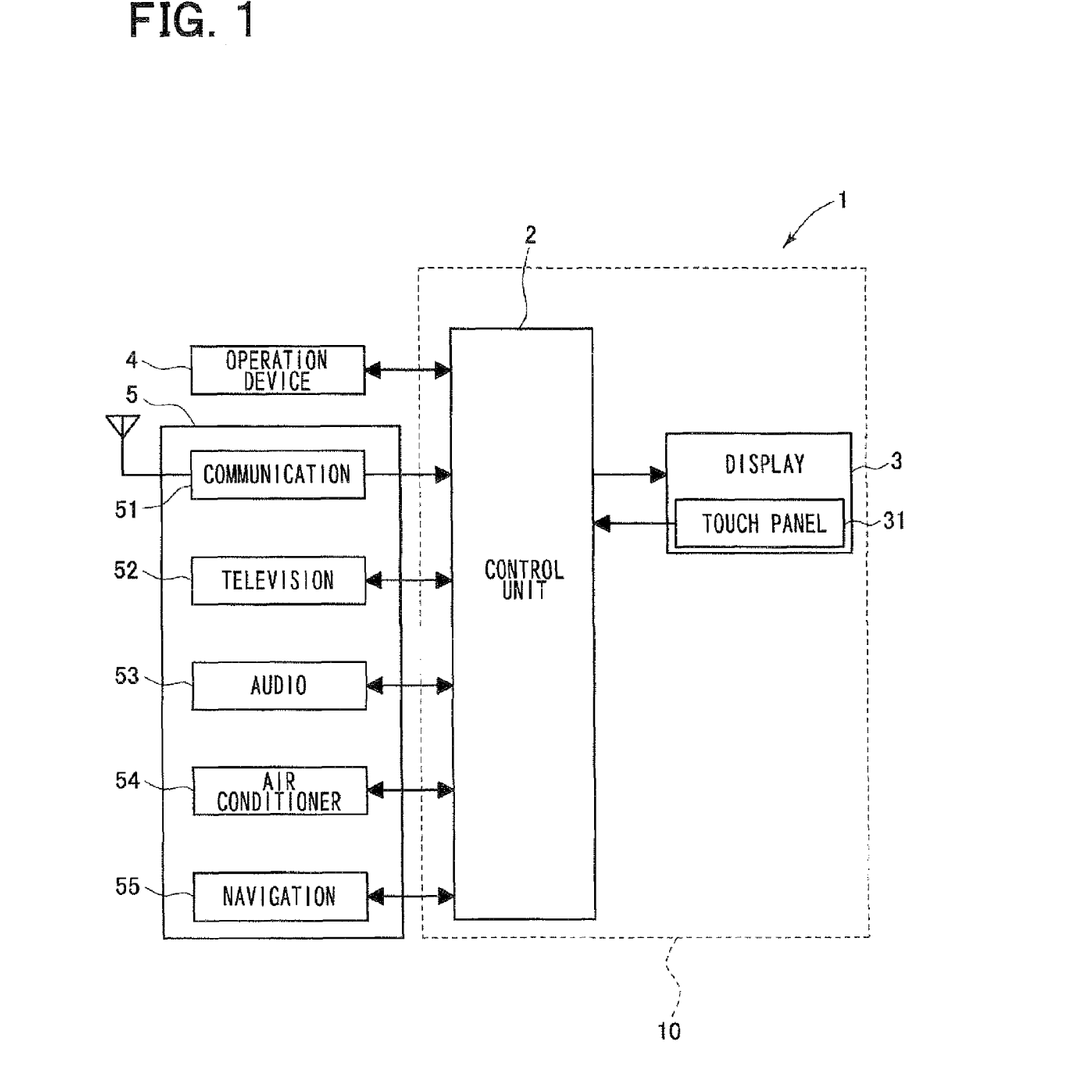
FIG. 1 is a block diagram showing an input operation system according to one embodiment.

As follows, an embodiment of an operation apparatus will be described with reference to drawings. FIG. 1 is a block diagram showing an input operation system according to an embodiment. In FIG. 1, an input operation system 1 includes a control unit 2 connected with a display device 3, an operation device 4, and various information devices 5. A display device 10 includes the control unit 2 connected with the display device 3. The input operation system 1 is an in-vehicle input operation system equipped to a vehicle such as an automobile. The information devices 5 include generally-known electrical devices such as a communication device 51, a television 52, an audio device (CD, DVD, tuner) 53, an air conditioner 54, and a navigation device 55. The control unit 2 controls the information devices 5 according to an operation to the operation device 4. The control unit 2 further performs a display control of the display device 3. The display device 3 has a rectangular screen. The rectangular screen of the display device 3 functions as a common display device of a television device or a navigation device. In addition, the rectangular screen of the display device 3 is configured to indicate an operation screen of the various information devices 5 according to a signal from the control unit 2.

Figure 2:
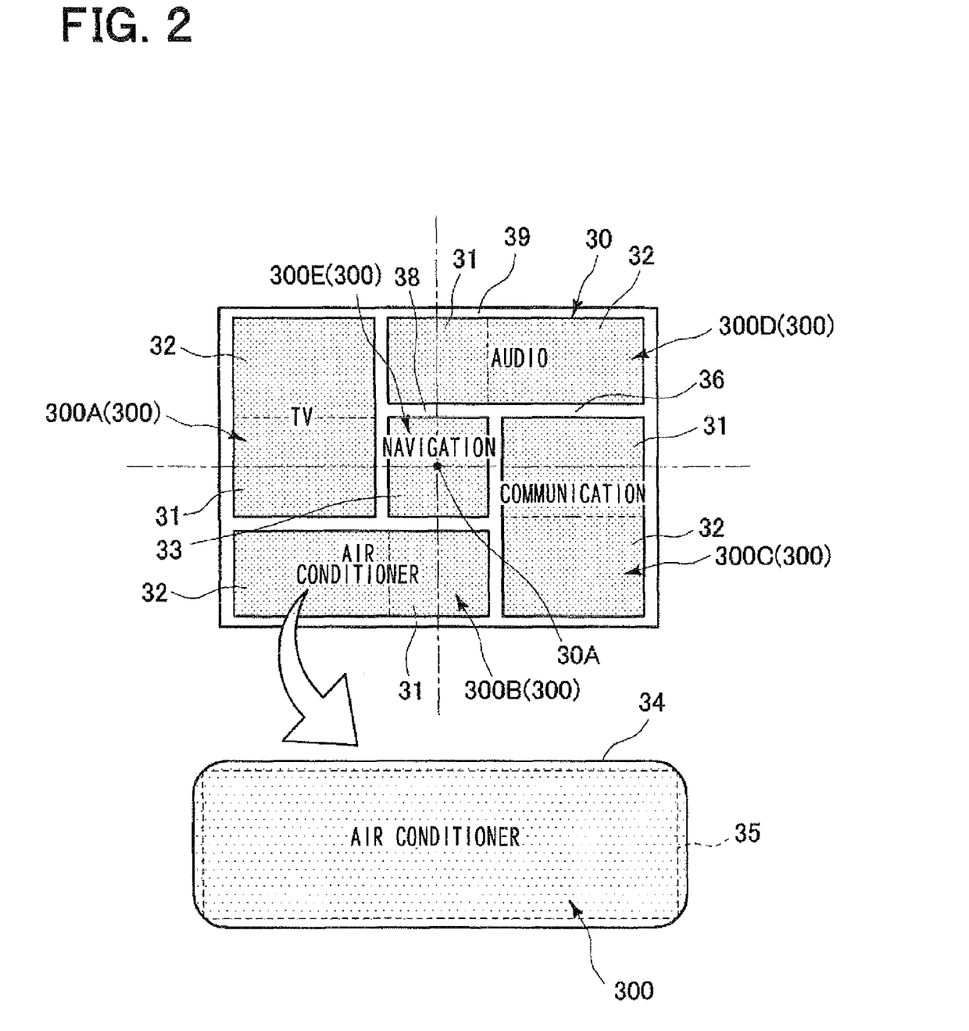
FIG. 2 is a first example of an operation screen indicated on a display device shown in FIG. 1.

As shown in FIG. 2, the operation screen indicates multiple operation images (manual operation buttons) 300 configured to selectively receive an input operation. The operation device 4 is configured as a pointing device to operate the operation image 300 indicated on the screen. When a user performs an input operation on either of the operation images 300 being indicated, the control unit 2 outputs a control signal to an information device 5 corresponding to the operation image 300 so as to execute a control content corresponding to the operation image 300.

As shown in FIGS. 2 to 6, four main regions 31 are assigned on the screen 30 of the display device 3. The four main regions 31 are assigned in a cross direction centering on a screen reference position 30A determined beforehand. More specifically, the four main regions 31 are assigned on the frontward side and the rearward side on each of two straight lines perpendicular to each other. The operation image 300 is located on each of the four main regions 31. At least one of the four operation images 300 represents an enlarged operation image, which is located over a corresponding main region 31 and an adjacent region 32. The adjacent region 32 extends continually from the main region 31 and is adjacent to the main region 31 around the screen reference position 30A. The operation image 300 is located centering on the screen reference position 30A in a cross manner (cross direction). Therefore, an operation direction to the operation device 4 is naturally limited to the cross direction. Thus, the operation image 300 is intuitively operable without confirming an operation direction of the operation device 4. In addition, the operation image 300 includes not only the main region 31 but also the enlarged operation image extended to the adjacent region 32. Thereby, the operation image 300 is enlarged to enable indication of more characters and symbols. In addition, the operation image 300 is enlarged to enable indication of larger characters and symbols to enhance visibility. The design of the operation image 300 is novel and excellent compared with a simple cross arrangement. In addition, the operation image 300 can cause a user to image an operation in the cross direction. Thus, operability of the operation image 300 can be also enhanced.

Further, as shown in FIGS. 2 to 6, the screen 30 of the display device 3 has an on-screen outer periphery region 36 located in the outer circumferential periphery of the screen center region 33, which includes at least the screen reference position 30A. The on-screen outer periphery region 36 includes a remaining region excluding unfilled space regions (unfilled outermost region) 39 assigned as outermost circumferential regions and boundary regions 38 each assigned between the operation images 300 adjacent to each other. In the remaining region of the on-screen outer periphery region 36, the four operation images 300 (300A to 300D) are located in a cross shape (cross direction). The four operation images 300 are paved in the remaining region of the on-screen outer periphery region 36. That is, each of the operation images 300 arranged in a cross manner on the screen 30 is extended to reach the unfilled space region 39 in the screen outermost circumference. In this way, the operation images 300 are located to use up at least the outer circumferential periphery of the screen without a waste area. Therefore, the operation image region can be assigned as much as possible.

In addition to the four operation images 300 (300A to 300D) located in the cross shape, an operation image 300 (300E) is indicated in the screen center region 33 of the screen 30. The five operation images 300 (300A to 300E) are paved in all the remaining regions of the screen 30 excluding the unfilled space region 39 and the boundary region 38 and indicated. Therefore, the operation image 300 is assigned to use up the region on the screen without a waste area. Thereby, a greater operation image region is secured. In the present embodiment, as shown in FIGS. 2 to 6, the screen reference position 30A coincides with the centroid position of the screen 30, in addition, the operation image 300E located at the screen center region 33 is in a square shape. Further, the centroid position of the image region of the operation image 300E coincides with the screen reference position 30A. In this way, the indicated operation image 300E is located at the center of the four residual operation images 300 (300A to 300D).

Referring to FIGS. 2 to 6, the four operation images 300 (300A to 300D) located in the cross shape satisfies the following conditions. The image region of each operation image 300 has a largest rectangle region 35 (FIG. 2). The largest rectangle region 35 is a largest area of a rectangle region surrounded by sides respectively in parallel with the sides of the screen 30. The area of the largest rectangle region 35 is greater than 50% of the total area of the image region 34 of the operation image 300. Further, the area of the largest rectangle region 35 may be greater than 80% of the total area of the image region 34 of the operation image 300. The operation image 300 represents a content related to the operation image 300. In general, a content of the operation image 300 is indicated within the rectangle region contained in the image region of the operation image 300. Therefore, when the area of the largest rectangle region 35 satisfies the above-described condition, the indication region of the content can be more largely secured.

Furthermore, a second condition may be added to the above-described condition (first condition). Specifically, the second condition is satisfied when the rectangle region forming the indication region of the operation image 300 is partitioned by opposed sides in parallel with two opposed sides of the rectangular screen 30. In general, a character string and a symbol string are indicated such that characters and symbols are located in a rectangle region and arranged in parallel with either of two opposed sides of the screen 30. Specifically, characters and symbols are arranged along the width direction or the longitudinal direction of the screen 30. Therefore, when the rectangle region having a large area and satisfying the above condition can be clipped from the operation image 300, more characters and symbols can be indicated in the image region of the operation image 300, and/or larger characters and larger symbols can be indicated in the image region of the operation image 300.

In the present embodiment, as shown in FIGS. 2 to 6, each operation image 300 is in a rectangular form surrounded by sides respectively in parallel with the corresponding sides of the screen 30. Thus, the largest rectangle region 35 can be clipped as large as possible. Each operation image 300 (300A to 300E) is not necessarily in a simple rectangle form. As shown in FIG. 2, each operation image 300 is in a rectangular form having corners chamfered in an R-shape. Each operation image 300 satisfies a condition that the area of the largest rectangle region 35 is greater than or equal to 80% of the total area of the image region 34 of the operation image 300, which includes the operation image 300. When the largest rectangle region 35 is greater than or equal to 80% of the total area of the image region 34, the shape of the operation image 300 is substantially in a rectangle form. Therefore, the operation image 300 can be easily paved on the screen 30 in the rectangular form. In addition, the operation image 300 is in a shape suitable for indication.

Figure 3:
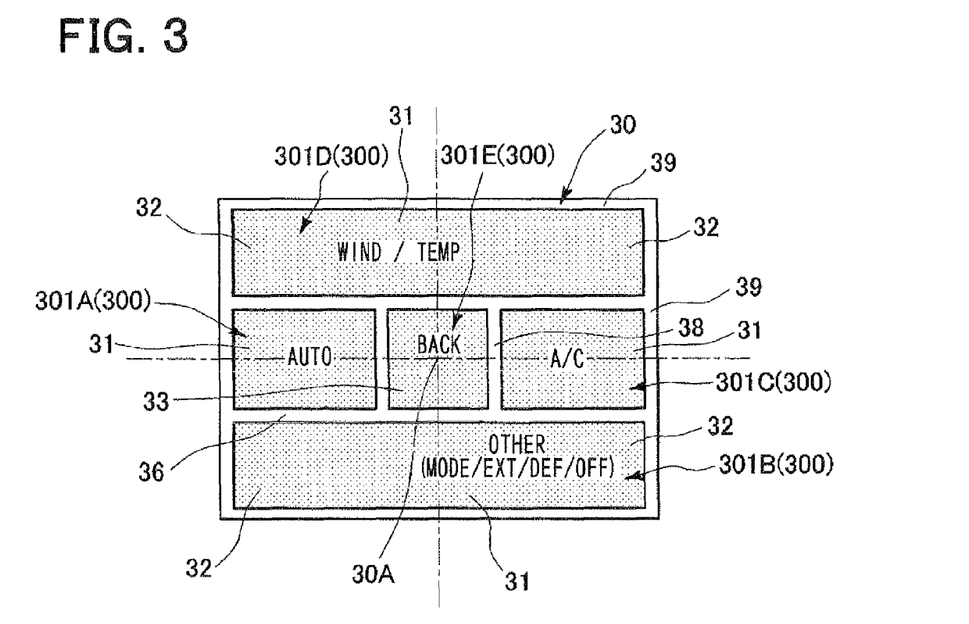
FIG. 3 is a second example of an operation screen indicated on the display device shown in FIG. 1.
Figure 4:
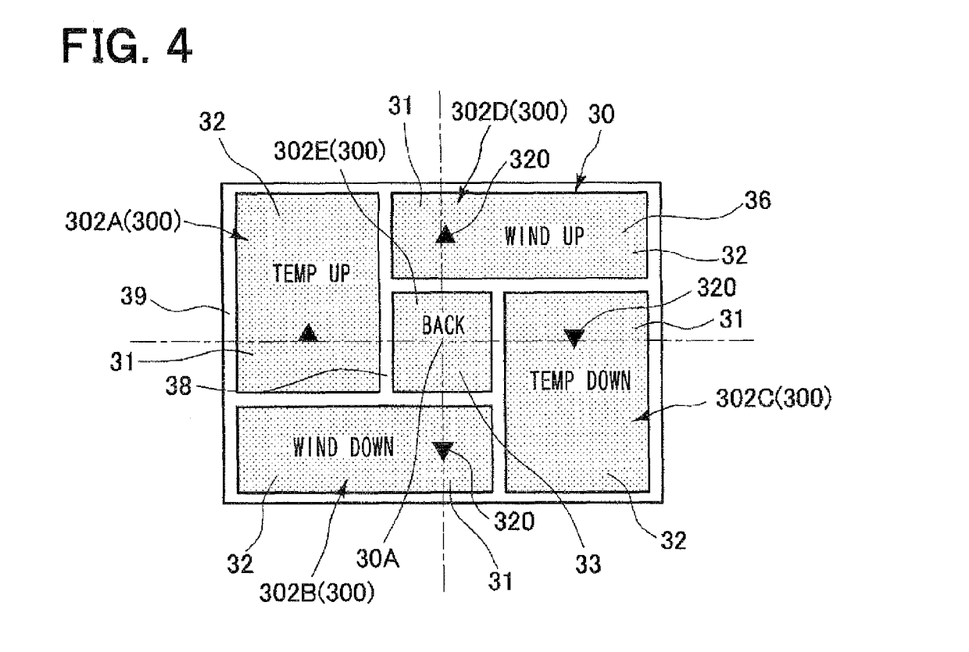
FIG. 4 is a third example of an operation screen indicated on the display device shown in FIG. 1.
Figure 5:
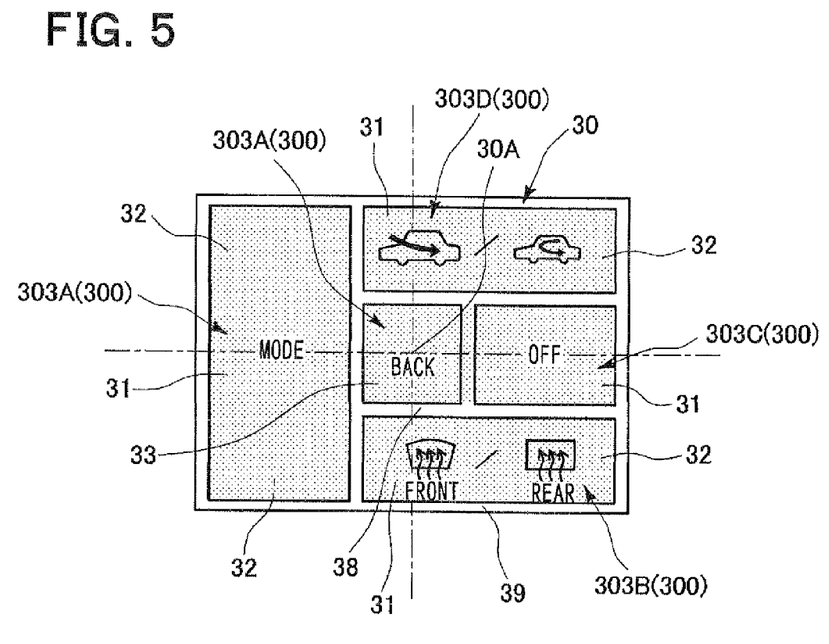
FIG. 5 is a fourth example of an operation screen indicated on the display device shown in FIG. 1.
Figure 6:
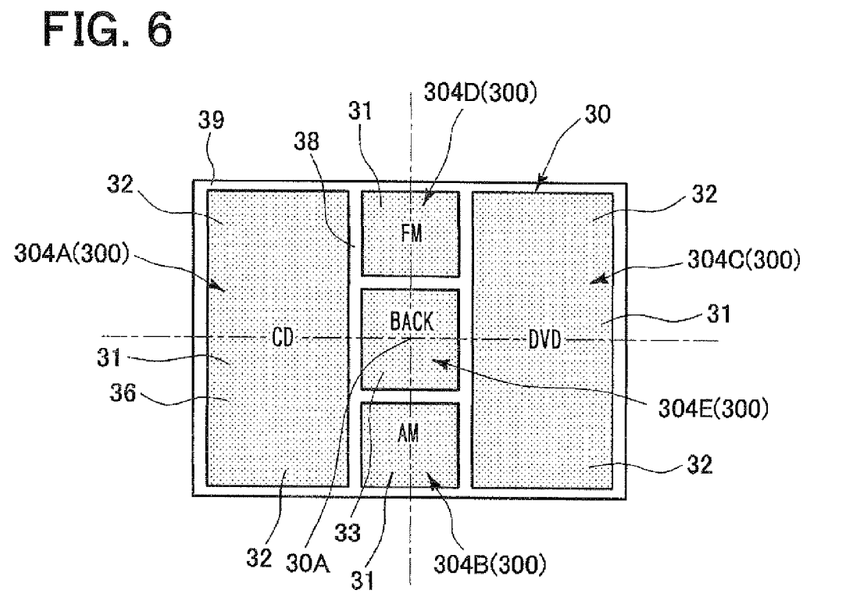
FIG. 6 is a fifth example of an operation screen indicated on the display device shown in FIG. 1.

The operation screen of FIG. 2 is a menu screen for selecting one of the information devices 5 to be used. FIGS. 3 to 6 show screens each being for manipulating the information device 5 selected on the menu screen. FIG. 3 shows a lower rank operation screen indicated when determination input is performed to the operation image 300B of FIG. 2. FIG. 4 shows a lower rank operation screen indicated when determination input is performed to the operation image 301D of FIG. 3. FIG. 5 shows a lower rank operation screen indicated when determination input is performed to the operation image 301B of FIG. 3. FIG. 6 shows a lower rank operation screen indicated when determination input is performed to the operation image 300D of FIG. 2. A user may perform determination input to the center operation image 301E to 304E of FIGS. 3 to 6 thereby to return to an upper rank operation screen.

The shape and the arrangement of the operation images 300A to 300E shown in FIGS. 2 to 6 are determined to be point-symmetric with respect to a screen reference position 30A, which is a centroid position of the screen 30. Alternatively, the shape and the arrangement of the operation images 300A to 300E shown in FIGS. 2 to 6 are determined to be axisymmetric with respect to a straight line (axis of symmetry), which is in parallel with one of opposed sides of the screen 30, the straight line passing through the screen reference position 30A. In this way, total design of the entire screen is enhanced.

In the operation screens of FIGS. 2 and 4, all the four operation images 300 (300A to 300D, 302A to 302D) are enlarged operation images located in a cross form. The region 32 adjacent to each of the four operation images 300 is continually extended from the corresponding main region 31 toward a first side in the circumferential direction around the screen reference position 30A. That is, all the operation images 300A to 300D located in the cross form are extended to the same side in the rotative direction around the screen reference position 30A. In the present example, all the operation images 300A to 300D are extended in the clockwise direction. Alternatively, all the operation images 300A to 300D may be extended in the anticlockwise direction. Each of the operation images 300E and 302E located in the screen center region 33 is substantially in a square shape, which coincides with the screen reference position 30A.

The operation screen of FIG. 4 is for operating control parameters of the information device 5 in the forward order or in the backward order. In the present example, one of the operation images 300 opposed to each other across the screen reference position 30A is a forward direction operation image for modifying a control parameter in the forward direction. The other of the operation images 300 opposed to each other across the screen reference position 30A is a backward direction operation image for modifying the control parameter in the backward direction. In this case, the operation images 300 are opposed to each other across the screen reference position 30A, in particular, the screen center region 33. Therefore, the forward and backward relationships of the operation images can be easily understood. Furthermore, forward-backward direction indication symbols 320 are located on a straight line, which passes through the screen reference position 30A, to indicate the forward direction and the backward direction. Therefore, a user can quickly recognize the forward direction and the backward direction. Furthermore, in the example of FIG. 4, the forward-backward direction indication symbols 320 are indicated respectively in the operation images 302D and 302B located across the screen center region 33 according to those physical relationships. In addition, the forward-backward direction indication symbols 320 are indicated respectively in the operation images 302A and 302C located across the screen center region 33, correspondingly to the arrangement directions of the adjacent regions 32 relative to the corresponding main regions 31. Specifically, the forward-backward direction indication symbols 320 are respectively indicated in the operation images 302D and 302B located on the upper side and the lower side to show the vertical direction corresponding to those positions. In this case, the forward-backward direction indication symbol 320 in the operation image 302D indicates the upward direction, and the forward-backward direction indication symbol 320 in the operation image 302B indicates the downward direction. Further, the forward-backward direction indication symbols 320 are respectively indicated in the operation images 302A and 302C located on the left side and the right side to show the vertical direction corresponding to the adjacent directions of the adjacent regions 32 relative to the main regions 21. In this case, the forward-backward direction indication symbol 320 in the operation image 302A indicates the upward direction, and the forward-backward direction indication symbol 320 in the operation image 302C indicates the downward direction.

In the operation screens of FIG. 3, FIG. 5, and FIG. 6, at least one operation image of the four the operation images 300 (301A to 301D, 303A to 303D, 304A to 304D) located in the cross form has the adjacent regions 32. Each of the adjacent regions 32 continually extends from the corresponding main region 31 to both first side and the second side in the circumferential direction around the screen reference position 30A. In this way, at least one operation image of the four the operation images 300 is an enlarged operation image extended over its adjacent regions 32 and 32 and its main region 31.

In the operation screens of FIGS. 3 and 6, the two operation images 300 (301B, 301D/304A, 304C) respectively have the main regions 31 opposed to each other across the screen reference position 30A. The operation images 300 (301B, 301D/304A, 304C) extend over its adjacent regions 32 and 32 and its main region 31 to both the first side and the second side in the circumferential direction around the screen reference position 30A. Further, two remaining operation images 300 (301A, 301C/304B, 304D) are located only in its main regions 31. In the case of FIG. 3, the enlarged operation images 301B and 301D are opposed in the vertical direction of the screen 30. In the case of FIG. 6, the enlarged operation images 304A and 304C are opposed in the horizontal direction of the screen 30.

In the operation screen of FIG. 5, one operation image 303A among the four the operation images 300 (303A to 303D) located in the cross form has the adjacent regions 32 and 32 located on both the first side and the second side of its main region 31 around the circumferential direction of the screen reference position 30A. In this manner, the operation image 303A functions as the first enlarged operation image located over both the adjacent regions 32 and 32 and its main region 31. On the other hand, each of two operation images 300 (303B, 303D) of the remaining operation images 300 (303B to 303D) adjacent to the first enlarged operation image 303A has the adjacent region 32 continuing from its main region 31 to the opposite side from the first enlarged operation image 303A. The two operation images 300 (303B, 303D) function as the second enlarged operation images each located over the adjacent region 32 and its main region 31. Remaining one operation image 300 (303C) is located only in its main region 31.

Figure 11:
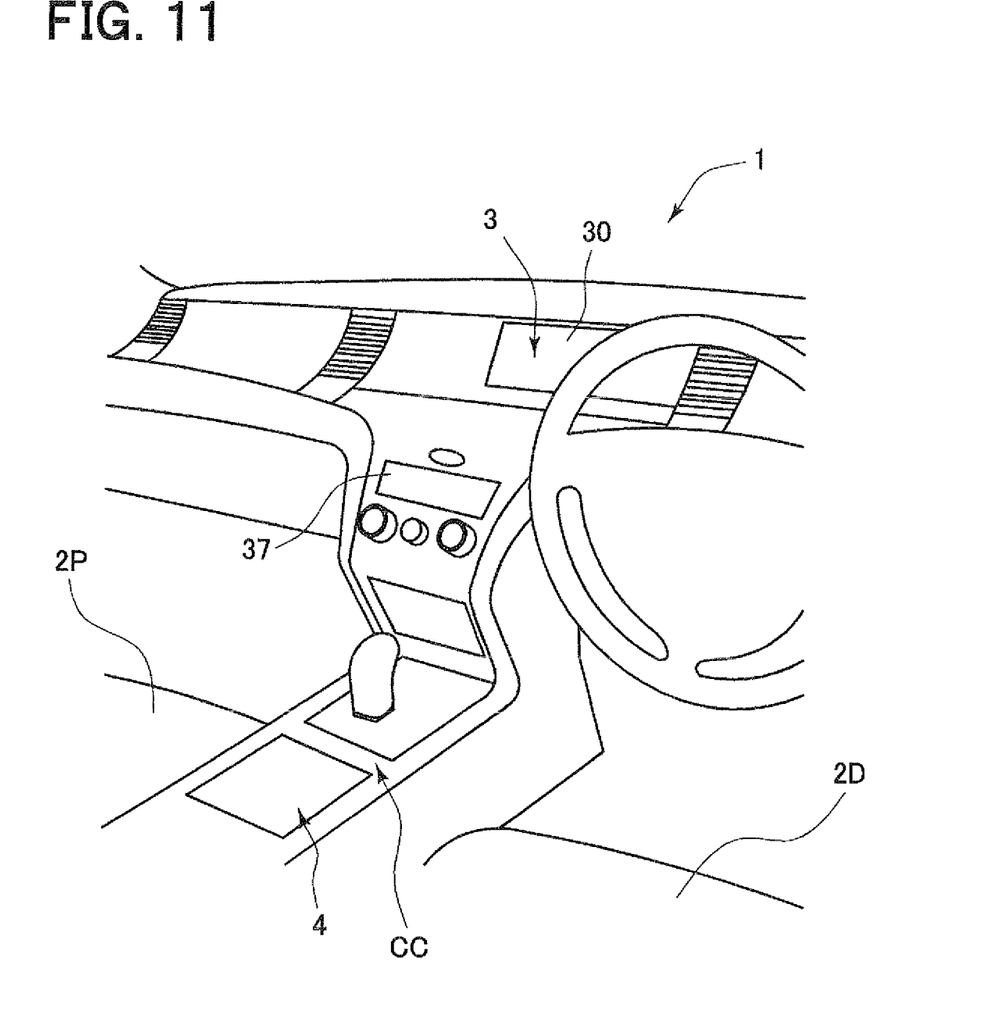
FIG. 11 is a view showing an interior of a vehicle equipped with the input operation system.

The display device 3 and the operation device 4 of the input operation system 1 of FIG. 1 are arranged in the manner shown in FIG. 11. The operation device 4 functions as a remote operation unit for performing remote operation input to the operation image (manual operation button) 300 indicated on the oblong screen 30 of the display device 3. In general, a touch panel 31 (FIG. 1) is provided on the screen 30 of the display device 3, and switch devices (not shown) are provided around the screen 30. The operation device 4 is located in a predetermined position nearer the seat 2P, 2D than the main operation unit so as to reduce burden of a user caused by operation of the operation device 4. In this example, the operation device 4 is located at a position such that both users (occupants) being seated on a driver seat 2D and a passenger seat 2P can operate the operation device 4 while laying themselves on backrests of the driver seat 2D and the passenger seat 2P. Specifically, the operation device 4 is located at a region (center console) CC interposed between both seats 2D and 2P of the vehicle. In this example, the operation device 4 is located between the driver seat and the passenger seat. The display device 3 is located on the front side of the vehicle beyond the operation device 4 such that the display device 3 is visible from users seated on the seats 2D and 2P.

The operation device 4 is configured to be operational from a predetermined neutral position in four directions corresponding to the cross direction of the operation image 300 on the screen 30. In particular, the forward and backward directions of the operation device 4 correspond to the vertical direction of the display device 3. The rightward and leftward directions of the operation device 4 correspond to the horizontal direction of the display device 3. The operation device 4 is operational in the forward and backward directions and the rightward and leftward directions. When a user performs an operation in these directions, the operation image 300 on the screen 30 is selected according to the correspondence of the directions.

Figure 12:
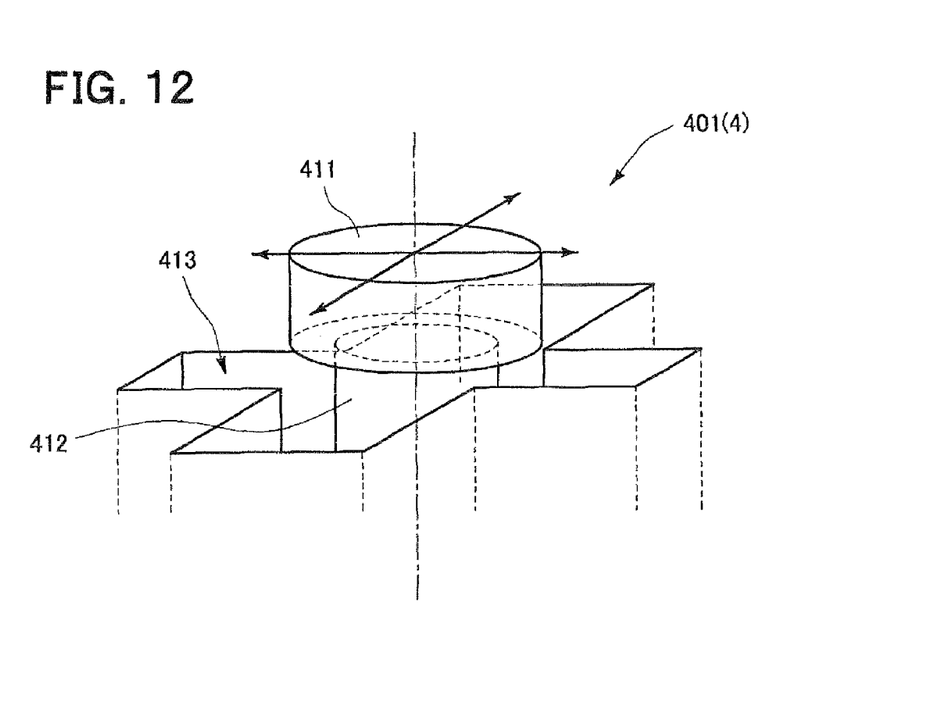
FIG. 12 is a perspective view showing a first example of an operation device applicable to the input operation system.

Furthermore, as shown in FIG. 12, the operation device 4 of the present embodiment is an operation device 401 provided with an operation knob 411 equipped on a control lever 412 and a guide portion (guide groove) 413 for regulating movement of the control lever 412. In this structure, the operation knob 411 is operational within a predetermined cross direction. The center position of the cross-form guide portion corresponds to the neutral position and equivalent to the screen reference position 30A. The operation knob 411 is enabled to accept a pressing operation in the axial direction (longitudinal direction) of the control lever. When a user operates the operation knob 411 in the cross direction to select the operation image 300, the user can perform determination input to the selected operation image 300 by pressing the operation knob 411.

The operation device 4 enables operation of the manipulate the information devices 5 being generally-known electrical devices, such as the communication device 51, the television 52, the audio device 53, the air conditioner 54, and the navigation device 55. Various instructions to the information devices 5 caused by operation of the operation device 4 may be indicated on the screen 30 or on another screen 37 (FIG. 11) in the vehicle. When such instructions are indicated on the screen 30, the instructions may be indicated in the operation image 300.

One embodiment of the present invention is described above. It is noted that the one embodiment is an example of the present invention. The present invention is not limited to the one embodiment and may be arbitrary modified to various forms by skilled person as long as being in the gist of the present invention. As follows, other embodiments will be described.

In the above embodiment, the shape and the arrangement of operation images 300 in one operation screen are different from the shape and the arrangement of operation images 300 in another operation screen, in some cases. The shape and the arrangement of operation images 300 may be constant in the operation screens in all the upper and lower hierarchy ranks.

In the above embodiment, the largest rectangle region 35 defines an noting region for noting information related to an operation image. In addition, a character string and a symbol string related to the operation image 300 are arranged in a direction in parallel with one of opposed sides of the rectangle region defining the noting region. It is noted that, as shown in FIG. 2, a character string and a symbol string related to the operation image 300 may be arranged along the longitudinal direction of each operation image 300. For example, a character string and a symbol string may be arranged in the horizontal direction when the corresponding operation image 300 has the width larger than the length. Alternatively, a character string and a symbol string may be arranged in the vertical direction when the corresponding operation image 300 has the length larger than the width.

Figure 9:
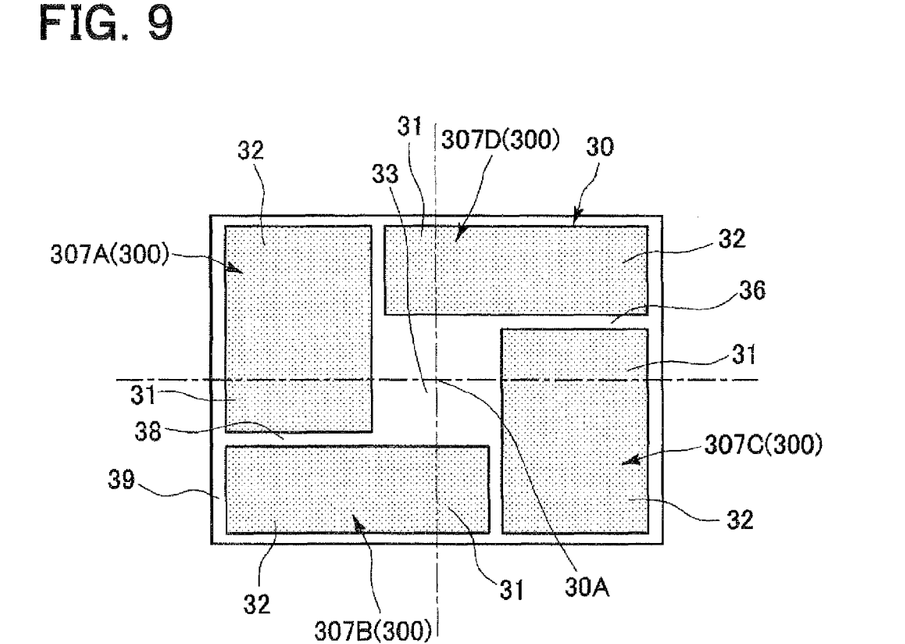
FIG. 9 is a eighth example of an operation screen indicated on the display device shown in FIG. 1.
Figure 10:
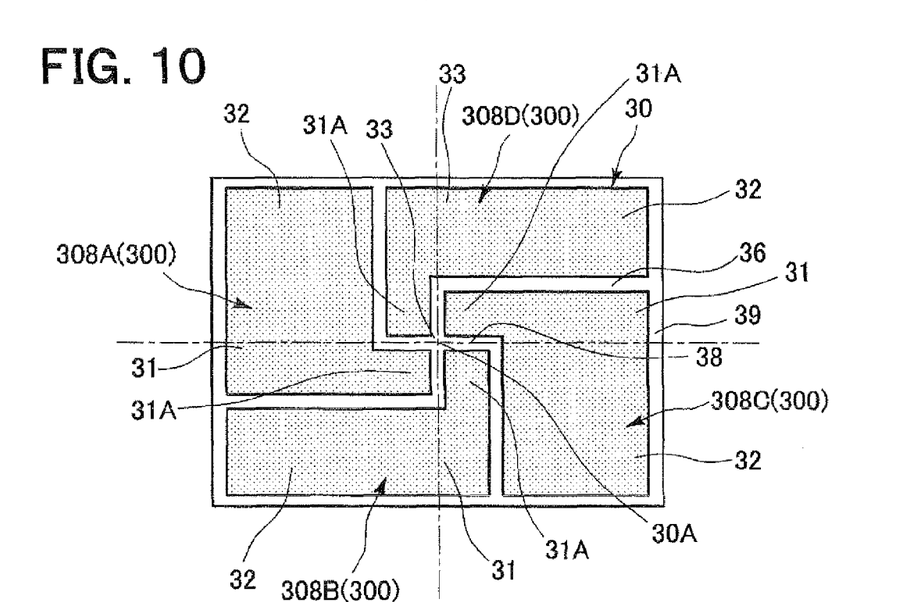
FIG. 10 is a ninth example of an operation screen indicated on the display device shown in FIG. 1.

In the above embodiment, in addition to the operation images 300 located in the cross form, the operation image 300 is located at the screen center region 33. It is noted that the operation image 300 is not necessarily located at the screen center region 33. As shown in FIG. 9, the operation images 300 (307A to 307D) may be located in the cross form without the operation image 300 at the screen center region 33. The operation image 300 need not be located in the screen center region 33, in addition to the operation images 300 located in the cross form. As shown in FIG. 10, a part of one of the operation images 300 located in the cross form or a part of each of (at least one of) the operation images 300 located in the cross form may be located in the screen center region 33. In this case, the four operation images 300 in the cross form are paved and indicted to occupy the remaining region in the screen 30 excluding the unfilled space region 39 and the boundary region 38. FIG. 10 shows a characteristic design in which a part of each of the operation images 300 (308A to 308D) located in the cross form extends to form an extended imaging region 31A extending into the square screen center region 33. In this case, the extended imaging regions 31A are point-symmetric with respect to the screen reference position 30A. In the form of FIG. 10, remaining imaging regions of the operation images 300 (308A to 308D) located in the cross form excluding the extended imaging regions 31A are also point-symmetric with respect to the screen reference position 30A. Thus, the form of FIG. 10 has a significantly characteristic design.

Figure 7:
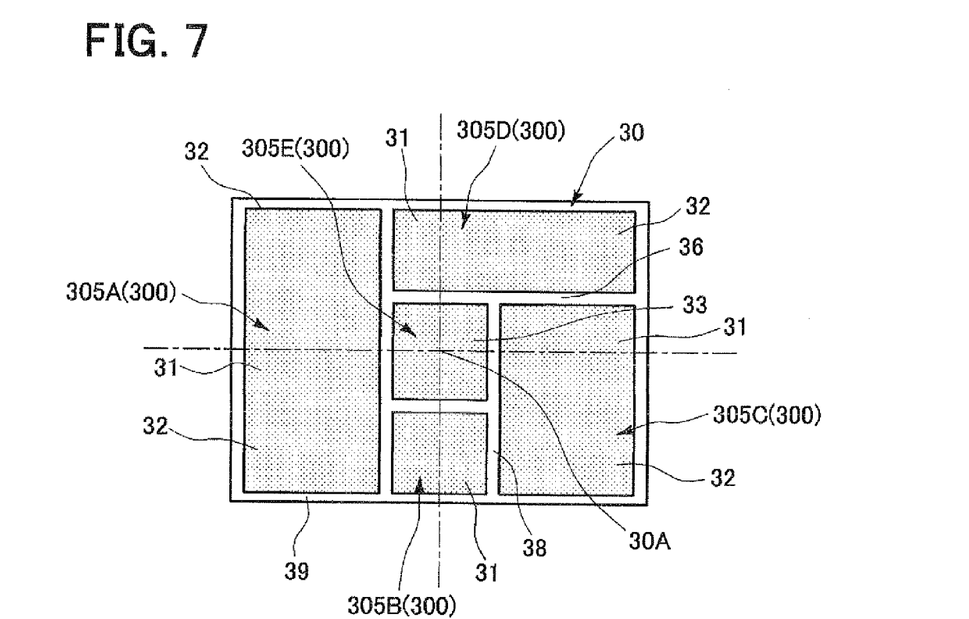
FIG. 7 is a sixth example of an operation screen indicated on the display device shown in FIG. 1.
Figure 8:
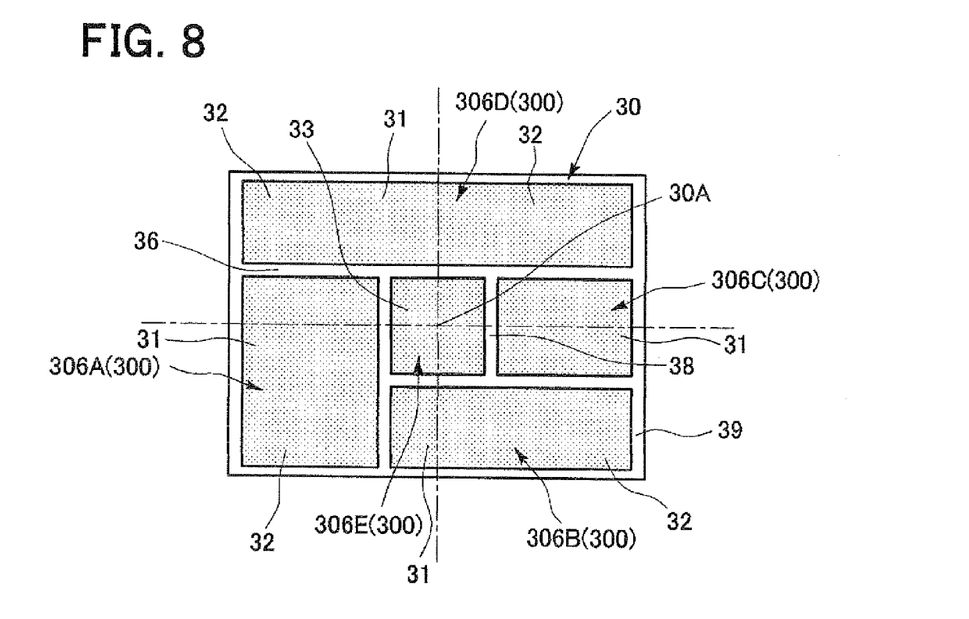
FIG. 8 is a seventh example of an operation screen indicated on the display device shown in FIG. 1.

The shape and the arrangement of the operation images 300 on the screen 30 may be in the form of FIG. 7 or FIG. 8. In the operation screens of FIG. 7 and FIG. 8, one operation image 300 (305A, 306D) among the four the operation images 300 (305A to 305D, 306A to 306D) located in the cross form has the adjacent regions 32 and 32 located on both the first side and the second side of its main region 31 around the circumferential direction of the screen reference position 30A. In this manner, the operation image 300 (305A, 306D) functions as the first enlarged operation image located over both the adjacent regions 32 and 32 and its main region 31. On the other hand, each of the operation images 300 (305D, 306A) of the remaining three operation images 300 (305B to 305D, 306A to 306C), adjacent to the first enlarged operation image 300 (305A, 306D), has the adjacent region 32 continuing from its main region 31 to the opposite side from the first enlarged operation image 300 (305A, 3060). The operation images 300 (305D, 306A) function as the second enlarged operation images each located over the adjacent region 32 and its main region 31. Each of the operation images 300 (305C, 306B) of the two remaining operation images 300 (305B, 305C and 306B, 306C), adjacent to the second enlarged operation images 300 (305D, 306A), has an adjacent region 32 extending from its main region 31 to the opposite side from the second enlarged operation images 300 (305D, 306A). The operation images 300 (305C, 306B) function as the third enlarged operation image located over the adjacent region 32 and its main region 31. The remaining one operation images 300 (305B, 306C) are located only in its main region 31.

Figure 13:
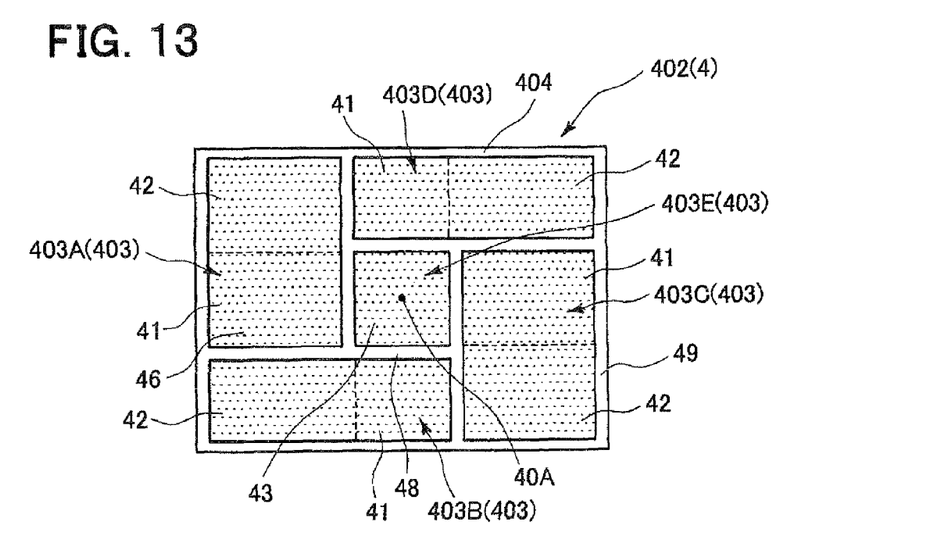
FIG. 13 is a perspective view showing a second example of an operation device applicable to the input operation system.

The operation device 4 may be configured of an operation device 402 equipped with a push operation unit 403 on the operation panel surface 404 correspondingly to the shape and the position of each operation image 300 indicated on the screen 30. In this case, the outline and the arrangement of the operation image 300 indicated on the screen 30 may be constantly maintained. FIG. 13 shows one example of the operation device 4 equipped with the push operation unit 403 corresponding to the operation image of FIG. 2. Similarly to the operation image of FIG. 2, the main regions 41 may be assigned in the cross direction centering on a predetermined reference position, and the push switches 403 (403A to 403D) may be respectively located on the four main regions 41. In addition, at least one push switch of the four operation images 403 is assigned to the push switch 403 (403A to 403D) located over the corresponding main region 41 and the adjacent region 42, which extends from the main region 41, in the circumferential direction around the reference position. A center region surrounded by the four push switches 403 (403A to 4030) is provided with another push switches 403 (403E). The center region includes the centroid position 40P of the operation panel 404. The push switches 403 are paved in the remaining region of all the regions including the outer circumferential periphery, in which the four push switches 403 (403A to 4030) are located, and the center region surrounded by the four push switches 403 (403A to 4030), excluding the unfilled space region 49 (outermost circumference region) and the boundary region 48 between the adjacent push switches 403.

In the above embodiment, the display device and the input operation system are applied to a vehicle. Alternatively, the display device and the input operation system may be applied to another object than a vehicle.

Summarizing the above embodiment, a display device having a rectangular screen is configured to indicate multiple operation images to enable an input operation selectively thereon. A main region is assigned on the screen in a cross direction centering on a predetermined screen reference position. Operation images are respectively located on the four main regions. At least one operation image of the four operation images forms an enlarged operation image located over a corresponding main region and an adjacent region, the adjacent region being continually adjacent to the main region in a circumferential direction centered on the screen reference position. In the screen, a screen outer periphery region is located in an outer circumferential periphery of a screen center region, which includes at least the screen reference position. The screen outer periphery region includes a remaining region excluding an unfilled space region assigned as a screen outermost circumference region and a boundary region between operation images adjacent to each other. In the remaining region, four operation images are paved. In the four operation images, a largest rectangle region is a largest area of a rectangle region contained in the image region of each operation image and surrounded by sides in parallel with the sides of the screen. An area of the largest rectangle region is greater than 50% of a total area of the image region of the operation image.

Conventionally, selection images are arranged substantially in a cross form in a screen to accept a selection input caused by an operation in a vertical and horizontal cross direction. In such a cross indication, useless blank portions, which are not used for indication, may arise in four corners of the screen. In such an operation image arranged in a cross form, only limited regions on the upper side, lower side, left side, and right side of a center region are formed. Accordingly, an indication region of the operation image becomes small. Consequently, fewer characters and less images are indicated. Contrary to such a conventional operation device, the four operation images substantially occupy the entire screen to surround the screen reference position according to the present structure. Therefore, viewability of the operation images can be enhanced. At least a part of the four operation images is located in the main region to be in the cross form centering on the screen reference position. Thereby, the arrangement of the operation images in the cross form can be easily recognized. Therefore, a user can be enabled to easily guess the operation direction corresponding to the arrangement of the operation images. Thus, operability of the device is not spoiled. According to the present structure, the area of the operation image located in the cross form is not simply enlarged but enlarged such that the rectangle region functioning as an indication region in the operation image is enlarged. Therefore, viewability of information in the operation image can be enhanced.

According to the present structure, the largest rectangle region functions as a notation region for indication related to an operation image. A character string related to the operation image is arranged in a parallel direction with either of the opposed sides of the rectangle region forming the notation region. In general, notation of a character string and a symbol is arranged in the longitudinal direction or the width direction of a screen. Therefore, contents of the notation can be increased or indication of the notation can be enlarged by securing the rectangular indication region, which extends in the direction of the notation, as much as possible in the operation image.

The screen reference position may be a centroid position of the screen. In this case, the operation images can be arranged with well balance in the screen. Thus, its design nature can be secured.

In the screen center region, an operation image other than the four operation images located in the cross form can be provided. In this case, the five operation images can be paved in a remaining region of all the regions of the screen excluding the unfilled space region and the boundary region. Thus, the cross-arranged operation images can be enlarged to reduce a waste region in the screen. In this case, the operation image located in the screen center region may be in a square shape.

Thereby, the operation image located in the screen center region can be easily recognized to be the center of the cross-arranged four operation images. Thus, the cross-form arrangement can be easily recognized visually.

The operation image may be in a rectangular form surrounded by sides being respectively in parallel with sides of the screen. In this case, the operation image is in a rectangular form, thereby the operation image can be easily arranged in the rectangular screen with less waste portions.

All the four operation images located in the cross form may be enlarged operation images. In this case, an adjacent region may continually extend from each main region to a first side in a circumferential direction centered on the screen reference position. In this case, the operation images located on the screen enable a user to imagine rotation to the first side in the circumferential direction. Therefore, a novel design can be obtained.

At least one operation image of the four operation images located in the cross form may have adjacent regions continually extending from its main region to both a first side and a second side in the circumferential direction around the screen reference position. In this case, the at least one operation image may form an enlarged operation image located over both the adjacent regions and its main region. In this case, the enlarged operation image is further enlarged. Therefore, a content indicated in the enlarged operation image can be increased or enlarged.

The four operation images located in the cross form may include two operation images respectively having main regions opposed to each other across the screen reference position. In this case, each of the two operation images may have adjacent regions continually extending from its main region to both a first side and a second side in the circumferential direction around the screen reference position. In this case, the at least one operation image may form an enlarged operation image located over both the adjacent regions and its main region. In this case, two further enlarged operation images can be obtained. Therefore, a content indicated in both the enlarged operation images can be increased or enlarged.

One operation image of the four operation images located in the cross form may have adjacent regions adjacent to its main region on both the first side and the second side in the circumferential direction around the screen reference position. In this case, the one operation image may form a first enlarged operation image located over both the adjacent regions and its main region. Further, each of two operation images of remaining operation images, adjacent to the first enlarged operation image, may have an adjacent region continuing from its main region to an opposite side from the first enlarged operation image. In this case, the two operation images may form a second enlarged operation image located over the adjacent region and its main region. In this way, the four operation images located in the cross form have various image areas. Therefore, an operation image assigned for an indicated content can be arbitrary selected.

The shape and the arrangement of the operation images in the screen may be determined such that the operation images are point-symmetric with respect to a point of symmetry, which corresponds to a centroid position of the screen. Alternatively, the shape and the arrangement of the operation images in the screen may be determined such that the operation images are axisymmetric with respect to an axis of symmetry, which is in parallel with either of two opposed sides of the screen and passes through the centroid position of the screen. In this case, the operation images can be arranged with symmetry in the screen. Thus, its design nature can be secured.

An input operation system may include the display device and an operation device configured to enable input operation selectively to the operation images in the screen. The display device enables the input operation system to facilitate a user to operate the input operation system. The display device indicates the operation images with an enhanced viewability of an indicated content. In addition, a user can recognize the cross direction of the operation images similarly to a conventional cross-directional indication of an operation image. Therefore, a user can operate the input operation system in a desired direction.

The operation device may be operational from a predetermined neutral position in four directions corresponding to the cross direction on the screen. In this case, an operation is regulated to permit only an operation in the four cross directions from the neutral position. Thus, an erroneous operation in an undesired direction can be reduced. In addition, the neutral position is associated to the screen reference position, thereby a user can easily imagine operation of the device correspondingly to the screen.

The operation device may include a push operation unit provided so that its shape and its position corresponding to the operation image indicated on the screen. In this case, the operation device may have a novel design.

The above structures of the embodiments can be combined as appropriate. The above processings such as calculations and determinations are not limited being executed by the control unit 2. The control unit may have various structures including the control unit 2 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A display device comprising:
    a screen substantially being in a rectangular shape and configured to indicate a plurality of operation images to enable an input operation selectively to the operation images, wherein
    the plurality of operation images include four operation images,
    the screen has four main regions located in a cross direction centered on a screen reference position, the four main regions being respectively assigned to the four operation images,
    at least one of the four operation images forms an enlarged operation image located over a corresponding one of the four main regions and an adjacent region, the adjacent region being continually adjacent to the corresponding one main region in a circumferential direction around the screen reference position, the screen has an outer periphery region being located in an outer circumferential periphery of a screen center region, which includes at least the screen reference position, the outer periphery region includes an unfilled outermost region, a boundary region, which is between operation images adjacent to each other, and a remaining region, in which the four operation images are paved, each of the four operation images has an image region including a rectangle region surrounded by sides, which are respectively being in parallel with sides of the screen, a largest rectangle region of the rectangle region has a largest area being greater than 50% of a total area of the image region, all the four operation images respectively form the enlarged operation images, and each adjacent region continues from corresponding main region to a first side in the circumferential direction around the screen reference position.

2. A display device comprising:

a screen substantially being in a rectangular shape and configured to indicate a plurality of operation images to enable an input operation selectively to the operation images, wherein the plurality of operation images include four operation images, the screen has four main regions located in a cross direction centered on a screen reference position, the four main regions being respectively assigned to the four operation images, at least one of the four operation images forms an enlarged operation image located over a corresponding one of the four main regions and an adjacent region, the adjacent region being continually adjacent to the corresponding one main region in a circumferential direction around the screen reference position, the screen has an outer periphery region being located in an outer circumferential periphery of a screen center region, which includes at least the screen reference position, the outer periphery region includes an unfilled outermost region, a boundary region, which is between operation images adjacent to each other, and a remaining region, in which the four operation images are paved, each of the four operation images has an image region including a rectangle region surrounded by sides, which are respectively being in parallel with sides of the screen, a largest rectangle region of the rectangle region has a largest area being greater than 50% of a total area of the image region, at least one of the four operation images has a main region, a first adjacent region, and a second adjacent region, the first adjacent region and the second adjacent region respectively continue from the main region to a first side and a second side in the circumferential direction around the screen reference position, the at least one operation image forms the enlarged operation image located over the first adjacent region, the second adjacent region, and the main region, one of the four operation images has a main region, a first adjacent region, and a second adjacent region, the first adjacent region and the second adjacent region are respectively adjacent to the main region on the first side and the second side in the circumferential direction around the screen reference position to form a first enlarged operation image located over the first adjacent region, the second adjacent region, and the main region, two of the four operation images other than the one operation image are adjacent to the first enlarged operation image, each of the two operation images has a main region and an adjacent region, the adjacent region continuing from the main region to an opposite side from the first enlarged operation image, and each of the two operation images forms a second enlarged operation image located over the adjacent region and the main region.

3. A display device comprising:

a screen substantially being in a rectangular shape and configured to indicate a plurality of operation images to enable an input operation selectively to the operation images, wherein the plurality of operation images include four operation images, the screen has four main regions located in a cross direction centered on a screen reference position, the four main regions being respectively assigned to the four operation images, at least one of the four operation images forms an enlarged operation image located over a corresponding one of the four main regions and an adjacent region, the adjacent region being continually adjacent to the corresponding one main region in a circumferential direction around the screen reference position, the screen has an outer periphery region being located in an outer circumferential periphery of a screen center region, which includes at least the screen reference position, the outer periphery region includes an unfilled outermost region, a boundary region, which is between operation images adjacent to each other, and a remaining region, in which the four operation images are paved, each of the four operation images has an image region including a rectangle region surrounded by sides, which are respectively being in parallel with sides of the screen, a largest rectangle region of the rectangle region has a largest area being greater than 50% of a total area of the image region, the operation image is in a rectangular shape having four corners each being chamfered, and the largest rectangle region is inscribed in the operation image.

* * * * *